United States Patent
Frey et al.

(10) Patent No.: US 9,215,131 B2
(45) Date of Patent: Dec. 15, 2015

(54) METHODS FOR EXCHANGING NETWORK MANAGEMENT MESSAGES USING UDP OVER HTTP PROTOCOL

(75) Inventors: Clifford A. Frey, San Francisco, CA (US); John Bicket, San Francisco, CA (US); Kevin Paul Herbert, San Francisco, CA (US); Varun Sagar Malhotra, Sunnyvale, CA (US); Benjamin A. Chambers, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 464 days.

(21) Appl. No.: 13/539,001

(22) Filed: Jun. 29, 2012

(65) Prior Publication Data

US 2014/0006481 A1 Jan. 2, 2014

(51) Int. Cl.
*H04L 12/24* (2006.01)
*H04L 29/06* (2006.01)
*H04L 29/08* (2006.01)

(52) U.S. Cl.
CPC .......... *H04L 41/0246* (2013.01); *H04L 63/029* (2013.01); *H04L 67/02* (2013.01); *H04L 69/165* (2013.01)

(58) Field of Classification Search
CPC ...... H04L 63/029; H04L 69/165; H04L 67/02
USPC ........................................................ 709/203
See application file for complete search history.

(56) References Cited

U.S. PATENT DOCUMENTS

| | | | |
|---|---|---|---|
| 6,789,116 B1 * | 9/2004 | Sarkissian et al. | 709/224 |
| 7,305,546 B1 * | 12/2007 | Miller | 713/153 |
| 7,367,051 B1 * | 4/2008 | Siegrist et al. | 726/3 |
| 2003/0009571 A1 * | 1/2003 | Bavadekar | 709/230 |
| 2003/0188001 A1 * | 10/2003 | Eisenberg et al. | 709/229 |
| 2003/0212739 A1 * | 11/2003 | Boucher et al. | 709/203 |
| 2005/0010670 A1 * | 1/2005 | Greschler et al. | 709/227 |
| 2005/0246346 A1 * | 11/2005 | Gerdes et al. | 707/10 |
| 2006/0031407 A1 * | 2/2006 | Dispensa et al. | 709/219 |
| 2006/0041917 A1 * | 2/2006 | Vellanki et al. | 725/86 |
| 2006/0235939 A1 * | 10/2006 | Yim | 709/217 |
| 2006/0274899 A1 * | 12/2006 | Zhu et al. | 380/281 |

(Continued)

OTHER PUBLICATIONS

Weber, Sebastian, "HTTPTunnel v1.2.1," 2010, downloaded from http://http-tunnel.sourceforge.net/, May 14, 2012, 2 pages.

(Continued)

*Primary Examiner* — Kevin Bates
*Assistant Examiner* — Mark A Scott
(74) *Attorney, Agent, or Firm* — Novak Druce Connolly Bove + Quigg LLP

(57) ABSTRACT

A network access device (NAD) receives a UDP packet from a client to be transmitted to a management server over Internet, the UDP packet including a management message. The NAD is one of NADs managed by the management server. The NAD determines whether the management server is reachable using a UDP protocol. The NAD transmits the UDP packet to the management server using the UDP protocol over the Internet if it is determined that the management server is reachable using the UDP protocol. Otherwise, the NAD extracts a UDP payload from the UDP packet, encapsulates the UDP payload within an HTTP POST request, and transmits the HTTP POST request having the UDP payload encapsulated therein to the management server using a HTTP protocol over the Internet.

22 Claims, 9 Drawing Sheets

(56) References Cited

U.S. PATENT DOCUMENTS

| | | |
|---|---|---|
| 2007/0165629 A1* | 7/2007 | Chaturvedi et al. ............ 370/389 |
| 2008/0177872 A1* | 7/2008 | Vengroff ........................ 709/223 |
| 2008/0250152 A1* | 10/2008 | Chou ............................. 709/230 |
| 2008/0285575 A1* | 11/2008 | Biswas et al. .................. 370/401 |
| 2008/0307037 A1* | 12/2008 | Zhang et al. ................... 709/203 |
| 2009/0064304 A1* | 3/2009 | Cohen et al. ................... 726/11 |
| 2010/0138485 A1* | 6/2010 | Chow et al. .................... 709/203 |
| 2010/0138534 A1* | 6/2010 | Mutnuru et al. ............... 709/224 |
| 2010/0142371 A1* | 6/2010 | Gooch et al. .................. 370/229 |
| 2010/0262650 A1* | 10/2010 | Chauhan et al. ............... 709/203 |
| 2010/0325300 A1* | 12/2010 | Vasters et al. ................. 709/231 |
| 2011/0069616 A1* | 3/2011 | Revels ........................... 370/236 |
| 2011/0099619 A1* | 4/2011 | Jewell ............................ 726/11 |
| 2012/0096114 A1* | 4/2012 | Mccolgan et al. ............. 709/217 |
| 2013/0117461 A1* | 5/2013 | Hsu et al. ....................... 709/228 |
| 2013/0191500 A1* | 7/2013 | Shafi et al. ..................... 709/217 |
| 2013/0282789 A1* | 10/2013 | Langworthy et al. ......... 709/203 |

OTHER PUBLICATIONS

Wahby, Riad, "Net::HTTPTunnel—Create sockets that are tunnels through an HTTP 1.1 proxy," Module Version 0.51, 2001, downloaded from http://search.cpan.org/~rwahby/Net-HTTPTunnel-0.51/HTTPTunnel.pm, May 14, 2012, 3 pages.

Brinkhoff, Lars, "httptunnel," Jun. 2008, downloaded from http://www.nocrew.org/software/httptunnel.html, 3 pages.

Peterson, Ian et al., "XEP-0124: Bidirectional-steams Over Synchronous HTTP (BOSH)," version 1.10, XMPP Standards Foundation, Jul. 2, 2010, downloaded from http://xmpp.org/extensions/xep-0124.html, 43 pages.

* cited by examiner

| Client ID | UDP Socket | HTTP Request | Optional Buffered Data |
|---|---|---|---|
| ⋮ | ⋮ | ⋮ | ⋮ |
| ⋮ | ⋮ | ⋮ | ⋮ |
| 401 | 402 | 403 | 404 |

METHODS FOR EXCHANGING NETWORK MANAGEMENT MESSAGES USING UDP OVER HTTP PROTOCOL

FIELD OF THE INVENTION

Embodiments of the present invention relate generally to networking. More particularly, embodiments of the invention relate to communications of management messages of a cloud managed network using a hypertext transfer protocol (HTTP).

BACKGROUND

Hypertext transfer protocol (HTTP) is an application-level protocol for retrieving interlinked resources, such as Web pages, on the World Wide Web. HTTP specifies the standard for requests and responses between a client and a server. Examples of HTTP clients include Web browsers, Web crawlers, and other end-user software tools that make requests on behalf of users in accordance with the HTTP standard. Examples of HTTP servers include Web servers hosting Web pages and servers of other internet resources that respond to HTTP requests.

Typically, when an HTTP client initiates an HTTP request, it first establishes a transmission control protocol (TCP) connection to a dedicated port on an HTTP server. TCP connection establishment uses a three-way handshake. First the client initiates the connection establishment by sending a connection request to the server. In response, the server replies with an acknowledgement of the connection request. Finally, the client sends an acknowledgement back to the server for the receipt of the server's acknowledgement. At this point, the TCP connection between the client and the server is established, and the client and server can begin data transfer to each other through the established TCP connection.

In contrast to TCP, user datagram protocol (UDP) is a message-based connectionless protocol that does not require hand-shaking dialogues for guaranteeing reliability, ordering, or data integrity. With UDP, applications can send messages, in this case referred to as datagrams, to other hosts on an Internet protocol (IP) network without requiring prior communications to set up special transmission channels or data paths. However, certain network configurations prevent the use of UDP to the Internet. In addition, some network configurations prevent direct TCP connections to the Internet as well. Some network configurations may only allow HTTP communication to the Internet if the HTTP communication is done through a HTTP Proxy. These network configurations are often implemented using a firewall. In such a situation, there has been a lack of efficient mechanisms for exchanging UDP packets between two endpoints.

BRIEF DESCRIPTION OF THE DRAWINGS

Embodiments of the invention are illustrated by way of example and not limitation in the figures of the accompanying drawings in which like references indicate similar elements.

FIG. 4 is an example of a UDP/HTTP mapping table according to one embodiment of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

A system for exchanging network management messages between network access devices (NADs) of local area networks (LANs) and a management server using a UDP over HTTP (UDP/HTTP) connection is described herein. According to some embodiments, each of the network access devices maintains a persistent connection with the management server using either a UDP over Internet protocol (UDP/IP) connection or a UDP/HTTP connection to transmit and receive network management messages with the management server or servers over a wide area network (WAN) such as the Internet. When a network access device attempts to send a network management message to the management server, if the management server is reachable via UDP/IP, the network management message is transmitted to the management server over an UDP/IP connection. However, if the management server is not reachable via the IP/UDP connection, the network access device encapsulates a UDP payload representing the network management message within a HTTP packet and transmits the HTTP packet to the management server over a UDP/HTTP connection. The network access device and the management server coordinate with each other to maintain the UDP/HTTP connection alive or open, such that the management server can send any management message back to the network access device at any time.

Figure 1:
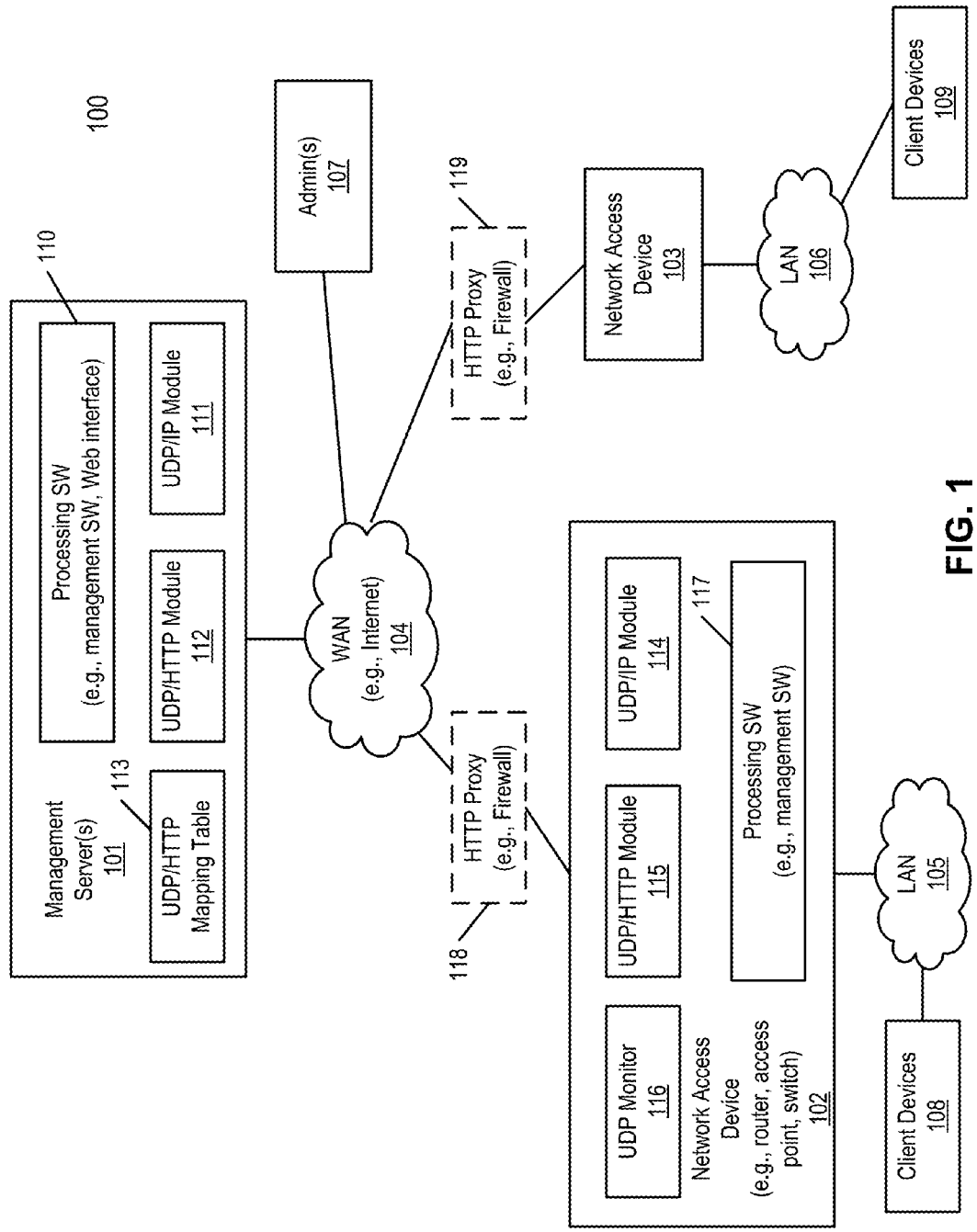
FIG. 1 is a block diagram illustrating a cloud managed network configuration according to one embodiment of the invention.

FIG. 1 is a block diagram illustrating a cloud managed network system according to one embodiment of the invention. Referring to FIG. 1, system 100 includes, but is not limited to, various network access devices (NADs) 102-103 (which may be wired and/or wireless) managed by a management server (MS) 101 over WAN 104. Management server 101 may be a Web or cloud server, or a cluster of servers, running on server hardware. Each of network access devices 102-103 is associated with a LAN such as LANs 105-106. Network 104 may be the Internet. Network access devices 102-103 may operate as a gateway device, an access point (AP), a network switch, or a combination thereof to LANs 105-106, respectively, where various client devices 108-109 can be communicatively coupled to LANs 105-106.

According to one embodiment, a network access device may present a gateway device interfacing a LAN to WAN 104 and performs network address translation (NAT) for its clients, which may be client devices 108-109 or other network access devices. A network access device may be configured behind another network access device. For example, an uplink of an access point may be coupled to a downlink of a gateway device. Alternatively, a network switch may be coupled to a downlink of a gateway device or an access point, etc. A network access device may be an integrated device integrating two or more of these functionalities (e.g., router/gateway, access point, and/or network switch), wired and/or wireless.

Referring back to FIG. 1, in this example, it is assumed that network access devices 102-103 are owned by the same organization and administrated by a network administrator 107 associated with the organization. Also note that for the purpose of illustration, although network access device 103 is not shown with details therein, network access device 103 has the same or similar architecture as network access device 102. For the purpose of illustration, only two network access devices are shown. However, it is not so limited; additional network access devices may be coupled to network 104 and managed by management server 101. In one embodiment, management server 101 works for both single and multi-tenant installations, meaning that multiple organizations with different network administrators may have network access devices managed by the same management server, and network configuration or management can be performed using the same management server, but that are firewalled off from each other and do not have access to each other's network configurations.

According to one embodiment, management server 101 includes a configuration and management (CM) module, which may be implemented as part of processing software 110, to configure network access devices 102-103 and to generate management server (MS) configuration information for each of network access devices 102-103. In one embodiment, management server 101 provides a user interface such as a Web interface to allow network administrator 107 to create and log into an account associated with the organization to which the network access devices 102-103 belong.

The management server 101 further includes NAD information database (not shown), including information regarding the network access devices 102-103. In one embodiment, the NAD information database 112 includes a serial number and a mechanism to authenticate the network access device's identity (e.g., the public key of a private public key pair, the private key of which was embedded or stored in the network access device during the manufacturing). This NAD information database may be populated different ways in different embodiments (e.g., populated by the seller of the network access devices, populated by the network administrator). In embodiments in which this information is populated by the seller, different ones of these embodiments may associate the information regarding network access devices 102-103 in the router information database with the user account in different ways (for example, the network administrator 107 may provide an order number (or invoice number) associated with a purchase of network access devices 102-103).

According to one embodiment, when a network access device, in this example network access device 102, is powered up and attempts entering network 104, network access device 102 attempts to contact management server 101. In one embodiment, certain device information such as an IP address or domain name service (DNS) name of management server 101 is stored in network access device 102 when it is manufactured. In one embodiment, when network access device 102 is powered up, the network access device performs any self configuration processes including obtaining an IP address for itself from a dynamic host configuration protocol (DHCP) facility (which address may be a public IP address, or may be a private IP address if there is a device performing NAT between the router and the WAN (that is to say, the network access device is behind a device performing NAT)). The network access device then accesses management server 101 based on the server's IP address and authenticates itself (e.g., signing a message (e.g., including the serial number of the network access device) using a private key associated (and/or stored) with the network access device, such that management server 101 can authenticate network access device 102 using the associated public key (stored in the NAD information database) maintained by management server 101).

In one embodiment, each of network access devices 102-103 creates one or more secure communication channels (e.g., a control tunnel) with server 101 using the keys downloaded from management server 101 to exchange control traffic such as management messages or notification, operating statues of the network access device, etc. In one embodiment, once network access device 102 has been successfully authenticated by server 101, network access device 102 downloads MS configuration information and stores it in a storage device within the network access device 102 (not shown). This download may take place over a secure session layer (SSL)-encrypted session and/or the management server may encrypt the data using the public key corresponding to the private key. This secure channel may also be used to receive subsequent configuration updates from the management server.

According to one embodiment, subsequently, when there is a change in the configuration, such as adding or removing a network access device, changing of subnet settings (for example, by administrator 107 via a Web interface of management server 101), management server 101 is configured to generate updated configuration information and communicate the updates to network access devices 102-103 via their corresponding control tunnels (such communication can be done with different mechanisms depending on the embodiment of type of information, including a push mechanism, a pull mechanism, etc.).

As described above, each of network access devices 102-103 maintains a persistent connection with management server 101 to exchange network management messages (e.g., network configuration or notifications from the management server, status reports from a network access device, etc.). In one embodiment, the network management messages may be exchanged via UDP packets exchanged using a UDP/IP protocol.

UDP is one of the core members of the Internet Protocol Suite, the set of network protocols used for the Internet. With UDP, computer applications can send messages, in this case referred to as datagrams, to other hosts on an IP protocol network without requiring prior communications to set up special transmission channels or data paths. UDP uses a simple transmission model without handshaking dialogues for providing reliability, ordering, or data integrity. Thus, UDP provides an unreliable service and datagrams may arrive out of order, appear duplicated, or go missing without notice. UDP assumes that error checking and correction is either not necessary or performed in the application, avoiding the overhead of such processing at the network interface level. Time-sensitive applications often use UDP because dropping packets is preferable to waiting for delayed packets, which may not be an option in a real-time system. If error correction facilities are needed at the network interface level, an application may use the Transmission Control Protocol (TCP), which is designed for this purpose. UDP applications use datagram sockets to establish host-to-host communications. An application binds a UDP socket to its endpoint of data transmission, which is a combination of an IP address and a UDP port.

Referring back to FIG. 1, management server 101 includes UDP/IP module 111, which communicates with UDP/IP module 114 of network access device 102 to exchange UDP packets that contain management messages between management server 101 and network access device 102. UDP/IP module 111 may be part of a UDP/IP layer of a network stack of management server 101 and similarly, UPD/IP module 114 may be part of a UDP/IP layer of a network stack of network access device 102. When processing software 110 sends a management message (e.g., query, configuration, notification, or installation) to network access device 102, processing software 110 sends the message to UDP/IP module 111. UDP/IP module 111 generates a UDP packet encapsulating the management message as a payload therein. UDP/IP module 111 then transmits the UDP packet to network access device 102 using the corresponding UDP/IP protocol. When the UDP packet arrives at network access device 102, UDP/IP module 114 is configured to process the UDP packet according to the standard UDP/IP protocol to obtain the management message embedded therein, and to pass the management message to processing software 117 to process the management message accordingly. Similarly, when processing software 117 attempts to send a management message (e.g., operating status report) to management server 101, processing software 117 invokes UDP/IP module 114 to send the management message as a UDP packet to management server 101, which is handled by UDP/IP module 111 in a similar manner.

However, under certain circumstances, management server 101 may not be reachable using the UDP/IP protocol from network access devices 102-103 or vice versa. For example, network access devices 102-103 may be located behind HTTP proxies 118-119 (e.g., firewalls), respectively. In some situations, an HTTP proxy may not allow traffic destined to a specific UDP port, which may be configured by disabling certain ports through a firewall. However, most of the firewalls allow HTTP traffic going through.

HTTP is an application protocol for distributed, collaborative, hypermedia information systems. HTTP is the foundation of data communication for the World Wide Web. Hypertext is a multi-linear set of objects, building a network by using logical links (the so called hyperlinks) between the nodes (e.g. text or words). HTTP is the protocol to exchange or transfer hypertext. HTTP functions as a request-response protocol in the client-server computing model. A client submits an HTTP request message to a server. The server, which provides resources such as hypertext markup language (HTML) files and other content, or performs other functions on behalf of the client, returns a response message to the client. The response contains completion status information about the request and may also contain requested content in its message body. HTTP is an application layer protocol designed within the framework of the Internet protocol suite. Its definition presumes an underlying and reliable transport layer protocol, and TCP predominates for this purpose. HTTP resources are identified and located on the network by Uniform Resource Identifiers (URIs) or, more specifically, Uniform Resource Locators (URLs) using the HTTP or secure HTTP (HTTPS) URI schemes.

Referring back to FIG. 1, according to one embodiment, network access device 102 includes a UDP monitor 116 to monitor a UDP connection with management server 101 to determine whether management server 101 is reachable using a UDP/IP protocol. When UDP/IP module is to send a UDP packet to management server 101, if UDP monitor 116 determines that management server is unreachable via the UDP/IP protocol, UDP/IP module 114 invokes a UDP/HTTP module 115 to encapsulate at least the UDP payload of the UDP packet within a HTTP packet. UDP/HTTP module 115 then transmits the HTTP packet having at least the UDP payload embedded therein to management server 101.

According to one embodiment, the UDP/HTTP packet is handled by UDP/HTTP module 112 of management server 101. In response to the UDP/HTTP packet, UDP/HTTP module 112 is configured to extract at least the UDP payload from the HTTP packet and process the UDP payload accordingly. Alternatively, UDP/HTTP module 112 may hand the UDP payload to UDP/IP module for normal UDP processing based on the standard UDP protocol. In addition, management server 101 further maintains a UDP/HTTP mapping table 113 to maintain mapping information between a UDP socket and an HTTP request received from a network access device. UDP/HTTP module 112 may store an entry in UDP/HTTP mapping table 113 to indicate that the UDP packet or UDP payload is received via an HTTP connection instead of a UDP/IP connection. As a result, when UDP/IP module 111 processes a UDP packet containing a management message received from processing software 110, UDP/IP module 111 passes the UDP packet to UDP/HTTP module 112. UDP/HTTP module 112 may look up UDP/HTTP mapping table 113 to determine whether the corresponding network access device is reachable using the UDP/IP protocol.

In one embodiment, if there is an entry corresponding to the UDP socket of the UDP packet, UDP/HTTP module 112 is to encapsulate the UDP packet or the UDP payload within an HTTP packet (e.g., a HTTP response to an outstanding HTTP request) and to transmit the HTTP packet to network access device 102 using an HTTP protocol. Processing software 110 may represent any client applications or system processes running at server 101, such as, configuration software for configuring network access devices 102-103, a Web interface or application programming interface (API) to allow administrator 107 to access server 101. In one embodiment, the UDP payload includes an IP packet encapsulated therein and processing software 110 is software that encapsulates and decapsulates such packets inside UDP datagrams. Note that some or all of the modules as shown in FIG. 1 can be implemented in software, hardware, or a combination of both. Note that throughout this application, network access devices are utilized as devices managed by management server 101 using a UDP/HTTP communications mechanism. However, the techniques described herein can also be applied to any device that can be assigned an IP address, such as client devices 108-109.

Figure 2:
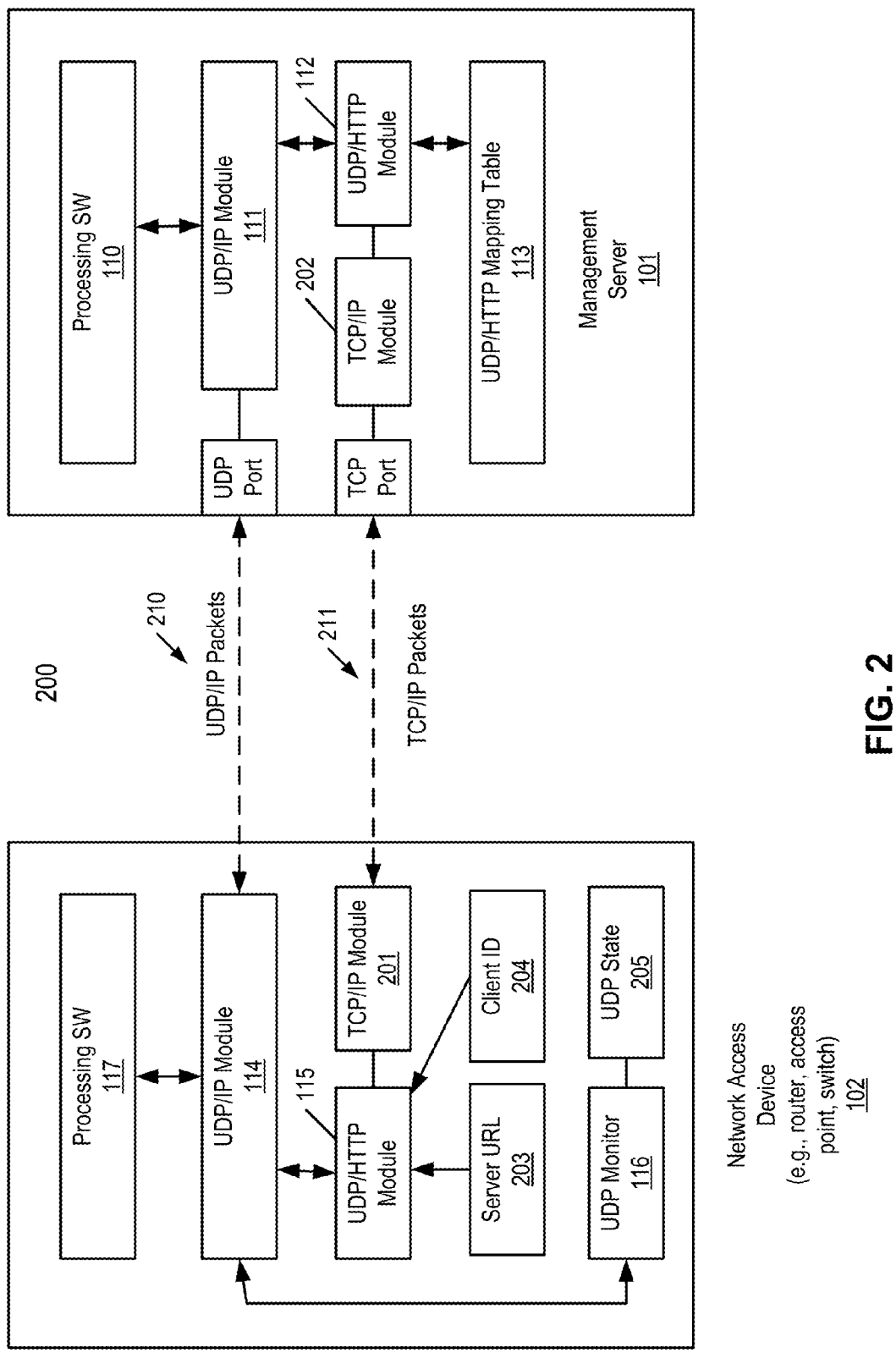
FIG. 2 is a block diagram illustrating a network configuration according to another embodiment of the invention.

FIG. 2 is a block diagram illustrating a network configuration according to another embodiment of the invention. System 200 may be implemented as part of system 100 of FIG. 1, where network access device 102 is communicatively coupled to management server 101 over the Internet. Referring to FIG. 2, when processing software 117 of network access device 102 wants to send a management message to server 101, processing software 117 passes the management message to UDP/IP module 114 which generates a UDP/IP packet. In one embodiment, UDP/IP module 114 communicates with UDP monitor 116 to determine whether management server 101 is reachable via the standard UDP/IP protocol.

As described above, UDP monitor 116 is configured to monitor UDP traffic exchanged between network access device 102 and management server 101 to determine whether management server 101 is reachable using the UDP/IP protocol. In one embodiment, UDP monitor 116 periodically (e.g., every 30 seconds) sends a PING or HELLO message to management server 101 using the standard UDP/IP protocol. If a response is received from management server 101 within a reasonable period of time, management server 101 is considered reachable via UDP/IP; otherwise, it is considered unreachable. Such a waiting period can be user configurable, such as, for example, by administrator 107. In one embodiment, such a waiting period is configured ranging approximately from 2 to 15 minutes. Typically, this situation occurs when network access device 102 is located behind a firewall that does not allow UDP traffic.

In some configurations, such firewall settings typically do not change often. According to one embodiment, during the initialization of network access device 102 (e.g., booting), UDP monitor 116 is configured to detect whether management server 101 is reachable via UDP/IP by sending one or more UDP/IP packets to management server 101. If no response is received from management server 101 within a predetermined period of time, it means that the management server 101 is unreachable via UDP/IP. UDP monitor 116 then stores such an indication as part of UDP states 205. Subsequently, when UDP/IP module 114 queries about the UDP state of management server 101, UDP monitor 116 can inform UDP/IP module 114 based on UDP state 205 whether management server 101 is reachable via UDP/IP. According to a further embodiment, when network access device 102 reboots, it checks a timestamp associated with UDP state 205 to determine when the last time UDP state 205 was updated. If UDP state 205 was updated within a predetermined period of time, UDP monitor 116 may not need to ping management server 101 again, because UDP state 205 is still considered valid.

If it is determined that management server 101 is reachable via UDP/IP, according to one embodiment, UDP/IP module 114 transmits the UDP/IP packet to management server 101. UDP/IP module 111 processes the received UDP/IP packet according to the UDP/IP protocol to obtain the management message carried therein, for example, removing the UDP/IP headers to reveal the management message as part of the payload. UDP/IP module 111 then forwards the management message to processing software 110 for network management purpose.

Figure 3:
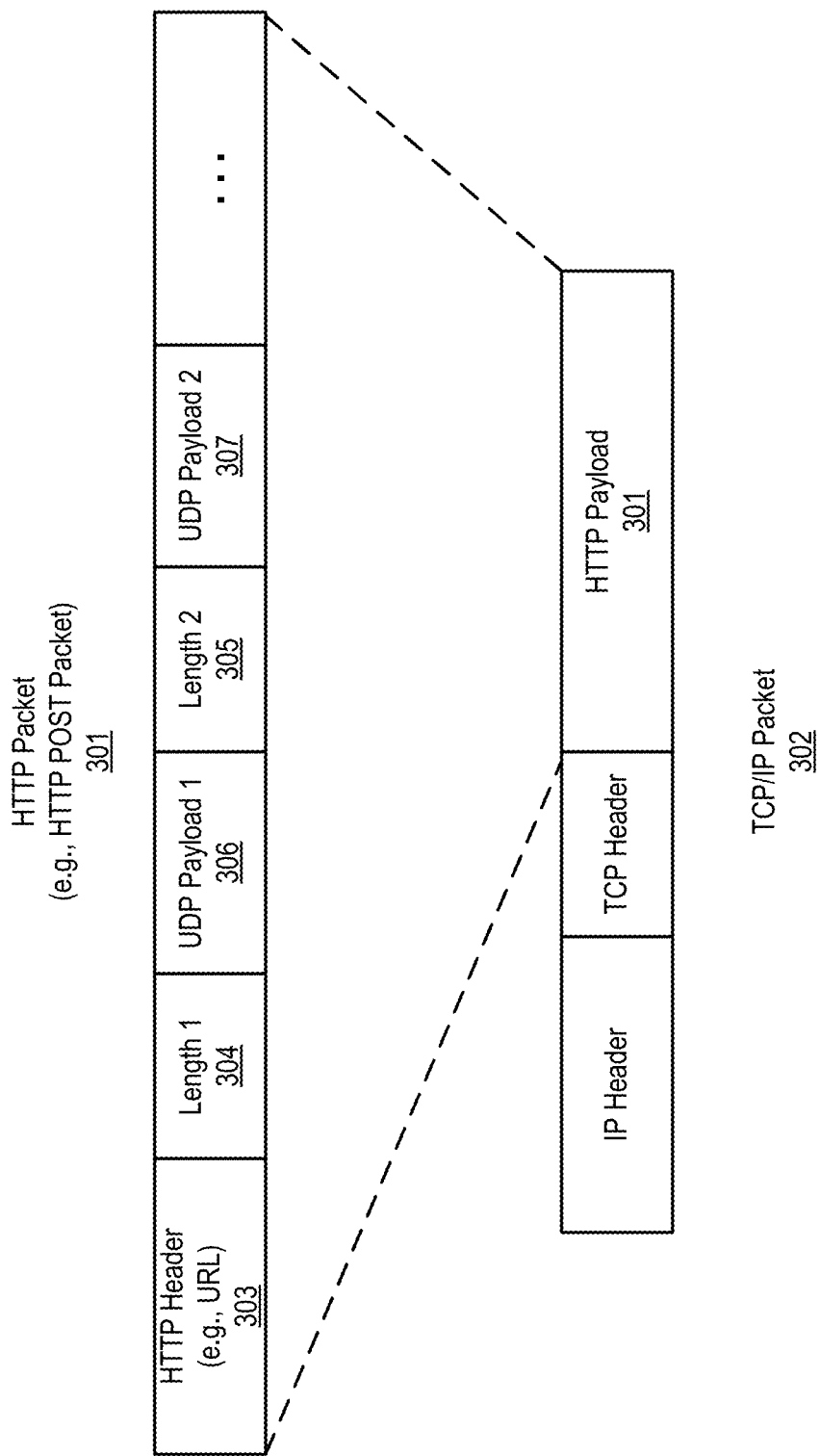
FIG. 3 is a block diagram illustrating a UDP/HTTP packet according to one embodiment of the invention.

If it is determined that management server 101 is unreachable via UDP/IP, according to one embodiment, UDP/IP module 113 passes the UDP/IP packet or only the UDP payload of the UDP/IP packet to UDP/HTTP module 115. UDP/HTTP module 115 encapsulates the UDP/IP packet or UDP payload within an HTTP packet, for example, in a form of an HTTP request. The HTTP packet is then passed to TCP/IP module 201, where TCP/IP module 201 may be implemented as part of a TCP/IP stack or layer of a typical network stack. TCP/IP module 201 constructs a TCP/IP packet having the UDP/HTTP packet as a payload and transmits the TCP/IP packet to management server 101. An example of such a TCP/IP packet is shown in FIG. 3 according to one embodiment. In this example, the TCP destination port may be specified as port 80 for HTTP or port 443 for HTTPS.

The TCP/IP packet having the UDP/HTTP packet embedded therein is received and processed by corresponding TCP/IP module 202. TCP/IP module 202 processes the received TCP/IP packet according to the standard TCP/IP protocol to obtain the UDP/HTTP packet as a payload. The UDP/HTTP packet is passed onto UDP/HTTP module 112 to extract the UDP packet or UDP payload embedded therein. The UDP packet or payload may further be handled by UDP/IP module 111 for standard UDP processing to obtain the network management message embedded therein. The network management message is then passed to processing software 110 as a client. In addition, UDP/HTTP module 112 may update the UDP/HTTP mapping information in UDP/HTTP mapping table 113 indicating that the current UDP session or connection is being handled via a UDP/HTTP tunnel. An example of such a UDP/HTTP mapping table is shown in FIG. 4 according to one embodiment.

According to one embodiment, a UDP/HTTP module (e.g., UDP/HTTP modules 115 and 112) may be implemented as part of an HTTP application layer of a network stack or a separate module (e.g., plug-in) communicatively coupled to either an application layer, UDP/IP layer, or TCP/IP layer of a network stack. In one embodiment, the UDP payload (a.k.a. the "management message") being encapsulated (either in UDP/IP or UDP/HTTP/TCP/IP) is an IP packet. In this situation, the job of processing software 110 is to take IP packets sent to certain IP addresses (namely those in the internal management IP address space) and encapsulate them in UDP datagrams, and then send them to the UDP/IP module to either be sent directly or alternatively to be HTTP encapsulated in UDP/HTTP module 112.

As described above, HTTP functions as a request-response protocol in the client-server computing model. In such a client-server model, a client submits an HTTP request message to a server. The server, which provides resources such as HTML files and other content, or performs other functions on behalf of the client, returns a response message to the client. The response contains completion status information about the request and may also contain requested content in its message body. Thus, once a response has been returned from a server, the HTTP connection is typically terminated, unless both ends support the keep-alive features, which may not always be supported.

According to one embodiment, in order to maintain an open HTTP connection without requiring the CONNECT feature to be supported, network access device 102, operating as a client, transmits a first HTTP request (e.g., initial HTTP request) to server 101 to establish a HTTP connection. When server 101 receives such an HTTP request, according one embodiment, server 101 may retain the HTTP request without immediately returning a response. When server 101 has data to be sent to network access device 102, the data is then encapsulated within an HTTP response and the HTTP response is then transmitted back to network access device. That is, if there is no data to be sent to network access device at the time an HTTP request was received, server 101 would retain the HTTP request without responding to keep the HTTP connection or session alive. The initial HTTP request may be transmitted from network access device 102 when the network access device 102 initially boots up and contact management server 101. The HTTP request includes a server URL 203 identifying server 101 and client ID 204 identifying network access device 102.

When there is new data (e.g., network management message or messages) to be sent from network access device 102 to server 101, according to one embodiment, the network access device 102 transmits a second HTTP request having the data embedded therein (e.g., UDP packet) to server 101. The second HTTP request may be sent even though network access device 102 has not received a response to the first HTTP request from server 101.

According to one embodiment, one or more UDP packets or UDP payloads having one or more management messages may be embedded within an HTTP packet. In one embodiment, an HTTP request may be an HTTP POST request. An HTTP POST request is defined to submit data to be processed (e.g., from an HTML form) to the identified resource. The data is included in the body of the request.

FIG. 3 is a block diagram illustrating a UDP/HTTP packet according to one embodiment of the invention. Referring to FIG. 3, an HTTP packet 301 can carry one or more UDP payloads (or UDP packets), including an HTTP header 303 and length fields 304-305 specifying the lengths of UDP payloads 306-307, respectively. HTTP header 303 may include information identifying a URL of the management server and a client identifier identifying the corresponding network access device. In one embodiment, HTTP header 303 includes the following:

/mtun-http/VER/t/CLIENT_IDENTIFIER where CLIENT_IDENTIFIER uniquely identifies the corresponding network access device from which the message is being sent, while "t" indicates this is a UDP/HTTP tunnel for network management purposes and the VER parameter indicates a protocol version.

According to one embodiment, prior to sending a network management message via a UDP/HTTP tunnel, a network access device first registers itself with the server. This allows the server to authenticate the network access device if necessary and also provide an opportunity to the server to deny or accept such communications (e.g., due to the processing bandwidth of the server). In one embodiment, a network access device can register by sending the following HTTP request to the server:

/mtun-http/VER/r/CLIENT_IDENTIFIER where "r" indicates this is a registration packet.

Referring back to FIG. 2, when server 101 receives the second HTTP request, according to one embodiment, UDP/HTTP module 112 is configured to extract the UDP payload from the HTTP packet and perform normal UDP processing, which may be handled by UDP/IP module 111. For example, UDP/HTTP module 112 may recreate a UDP packet and hand the UDP packet to UDP/IP module 111. As a result, the normal UDP/IP layer of a typical network stack can be utilized. Note that the UDP payload may include an IP over UDP packet, where the UDP packet includes another IP packet for management purposes between the management server and a network access device. The IP packet embedded within the UDP packet may include specific internal IP addresses (e.g., source and destination IP addresses) that are used only between a network access device and the management server for exchanging network management messages. That is, a network access device may use another IP address to communicate with client devices that are associated with the network access device. The management server and the network access devices of an organization as an owner form a logical management network using the internal IP addresses solely for exchanging network management messages. Such internal IP addresses are only recognized by the management server 101 and network access devices 102-103 for tunneling management messages.

In addition, server 101 checks whether there is a previous HTTP request pending for response, in this example, the first HTTP request. In one embodiment, UDP/HTTP module 112 is configured to look up UDP/HTTP mapping table to determine whether there is an outstanding HTTP request that is still pending (e.g., no reply has been returned yet). If there is an HTTP request (e.g., the first HTTP request) currently pending, a reply to the previously received pending HTTP request is turned back to the network access device, while withholding the second HTTP request without a reply. For example, the second HTTP request is populated in an entry in UDP/HTTP mapping table 113.

FIG. 4 is an example of a UDP/HTTP mapping table according to one embodiment of the invention. Mapping table 400 may be implemented as part of UDP/HTTP mapping table 113 of FIG. 1, which may be implemented in a variety of data structures or databases. Referring to FIG. 4, mapping table 400 includes one or more entries, each entry corresponding to an HTTP request that is pending without response. According to one embodiment, each entry includes field 401 storing a client identifier, field 402 storing a UDP socket number, field 403 to store a pending HTTP request, and field 404 to store data pending to be sent to a client. A client identifier stored in field 401 uniquely identifies a network access device, which may be stored within the network access device when the network access device was manufactured. A client identifier may be obtained when a network access device contacts the management server during the initialization of the network access device or via an HTTP registration as described above (e.g., CLIENT_IDENTIFIER). A UDP socket number stored in field 402 represents a UDP socket assigned or allocated between the network stack and the operating system for a UDP session or connection. A UDP socket number may be allocated or assigned when a network access device communicates with the management server during the initialization or via the HTTP registration. An HTTP request stored in field 403 represents a pending HTTP request withheld by the management server without responding. Buffered data stored in field 404 represents data to be sent from the management server to a network access device identified by a client identifier stored in field 401. Typically, the data is buffered in field 404 when there is no HTTP request pending in field 403; otherwise, the data would have been sent via a response to a pending HTTP request.

Referring to FIGS. 2 and 4, when UDP/HTTP module 112 looks up at UDP/HTTP mapping table 400, it searches and locates an entry that has a client ID of field 401 matching a client ID of the HTTP request such as CLIENT_IDENTIFIER in the above HTTP request example. If such an entry exists, it indicates that there is an outstanding HTTP request, which is stored in field 403. In this embodiment, a reply corresponding to the outstanding HTTP request is returned to network access device 102 and the corresponding entry is updated with the second HTTP request, for example, by replacing the first HTTP request with the second HTTP request in field 403. Alternatively, the existing entry corresponding to the first HTTP request is deleted from the mapping table 400 and a new entry is allocated to represent the second HTTP request.

According to one embodiment, instead of immediately returning a reply of the first HTTP request to network access device 102, server 101 may delay with an additional period of time (e.g., 10-50 milliseconds). In this way, if the data received via the second HTTP request causes new data to be sent from server 101 to network access device 102, the new data can be encapsulated within the reply to the first HTTP request. A single HTTP request or response can encode multiple UDP packets or payloads, where each payload can be preceded by the length of that payload as shown in FIG. 3. This can minimize the overhead of the TCP connection (if HTTP keep-alive option cannot be used) and HTTP headers.

HTTP keep-alive is the idea of using the same TCP connection to send and receive multiple HTTP requests/responses, as opposed to opening a new connection for every single request/response pair. Dependent upon the specific circumstances, such an HTTP keep-alive option may or may not be supported by a device. If both ends support such an option, it is preferable to use the HTTP keep-alive option, for example, by specifying a proper header field in an HTTP header.

According to one embodiment, when network access device 102 receives a response from server 101, UDP/HTTP module 115 strips off the HTTP header to recover the UDP packet or payload therein and hands it over to UDP/IP module 114 for UDP processing. In addition, UDP/HTTP module 115 determines whether there is an outstanding HTTP request that has not received a response from server 101. In this embodiment, network access device 102 may maintain a data structure to store information whether an outstanding HTTP request is still pending. If there is no outstanding HTTP request, UDP/HTTP module 115 may send another HTTP request (e.g., an empty HTTP request) to server 101 to keep the HTTP connection open. According to one embodiment, network access device 102 may delay a short period of time (e.g., 10-50 milliseconds) instead of immediately sending the new HTTP request to server 101. In this way, if the previously response causes new data to be sent to server 101, the new data can be encoded within the new HTTP request sent to server 101.

When processing software 110 of server 101 generates data to be sent to network access device 102, the data is passed to UDP/IP module 111 to generate a UDP packet as part of normal UDP processing. According to one embodiment, UDP/IP module 111 determines whether the UDP packet should be sent to network access device 102 via path 210 using the UDP protocol or alternatively, it should be sent to UDP/HTTP module 112 which encapsulates the UDP packet within an HTTP packet to be sent to network access device 102 via path 211. In one embodiment, UDP/IP module 111 decides how to send a message to a given client, in this example, network access device 102, based on how it last received messages from that client device. In either case, UDP/IP module 111 will have received a UDP message from a UDP socket, which is either associated with UDP/IP module 114 of network access device 102 or UDP/HTTP module 112 of management server 101. In the direct UDP case, the other end of that UDP socket is connected to UDP/IP module 114 in network access device 102. If network access device 102 is instead communicating using HTTP, then UDP/IP module 111 will have received the last UDP message directly from UDP/HTTP module 112, so the UDP socket's other end will be UDP/HTTP module 112. That is, UDP/HTTP mapping table 113 is not used to determine whether to send a reply via HTTP or UDP; it is only used for keeping track of the connection for clients that are known to be using UDP/HTTP module 112.

In one embodiment, UDP/HTTP module 112 looks up in UDP/HTTP mapping table 113 to determine whether the network access device 102 is reachable via UDP/IP. If UDP/HTTP mapping table 113 contains an entry having a UDP socket number (e.g., field 402 of FIG. 4) matching the one with the UDP socket corresponding to processing software 110, it means that network access device 102 is unreachable via UDP/IP and the UDP traffic must be carried over via HTTP. Thus, if network access device 102 is reachable via UDP/IP, the UDP packet is sent by UDP/IP module to network access device 102. Otherwise, the UDP packet is passed to UDP/HTTP module 112. The UDP/HTTP module 112 encapsulates at least the UDP payload in an HTTP response (e.g., HTTP POST response) and TCP/IP module 202 transmits the HTTP response within a TCP/IP packet to network access device 102.

According to another embodiment, management server 101 maintains at least two components: 1) a process that encapsulates and decapsulates IP packets inside UDP datagrams (also referred to as an mTunnel process, which may be performed by UDP/IP module 111); and 2) a process that encapsulates and decapsulates UDP-encapsulated IP packets (e.g. as from the first process) inside HTTP request responses (also referred to as an mTunnel-http-server process, which may be performed by UDP/HTTP module 112). If management server 101 wants to send an IP packet to a network access device, it will first go to the mTunnel process which will encapsulate the IP packet into a UDP-encapsulated-IP packet (e.g., an IP/UDP packet), and send it to the mTunnel-http-server process. The mTunnel-http-server process receives the IP/UDP packet on a specific UDP socket. It then looks in UDP/HTTP mapping table 113 as shown in FIG. 4 at the row corresponding to that UDP socket (e.g., field 402 of FIG. 4). It will then either send the encapsulated packet as a response to the HTTP request in that row, or it will add the encapsulated packet to the buffered data in that row to be sent in response to the next HTTP request that is received.

Figure 5:
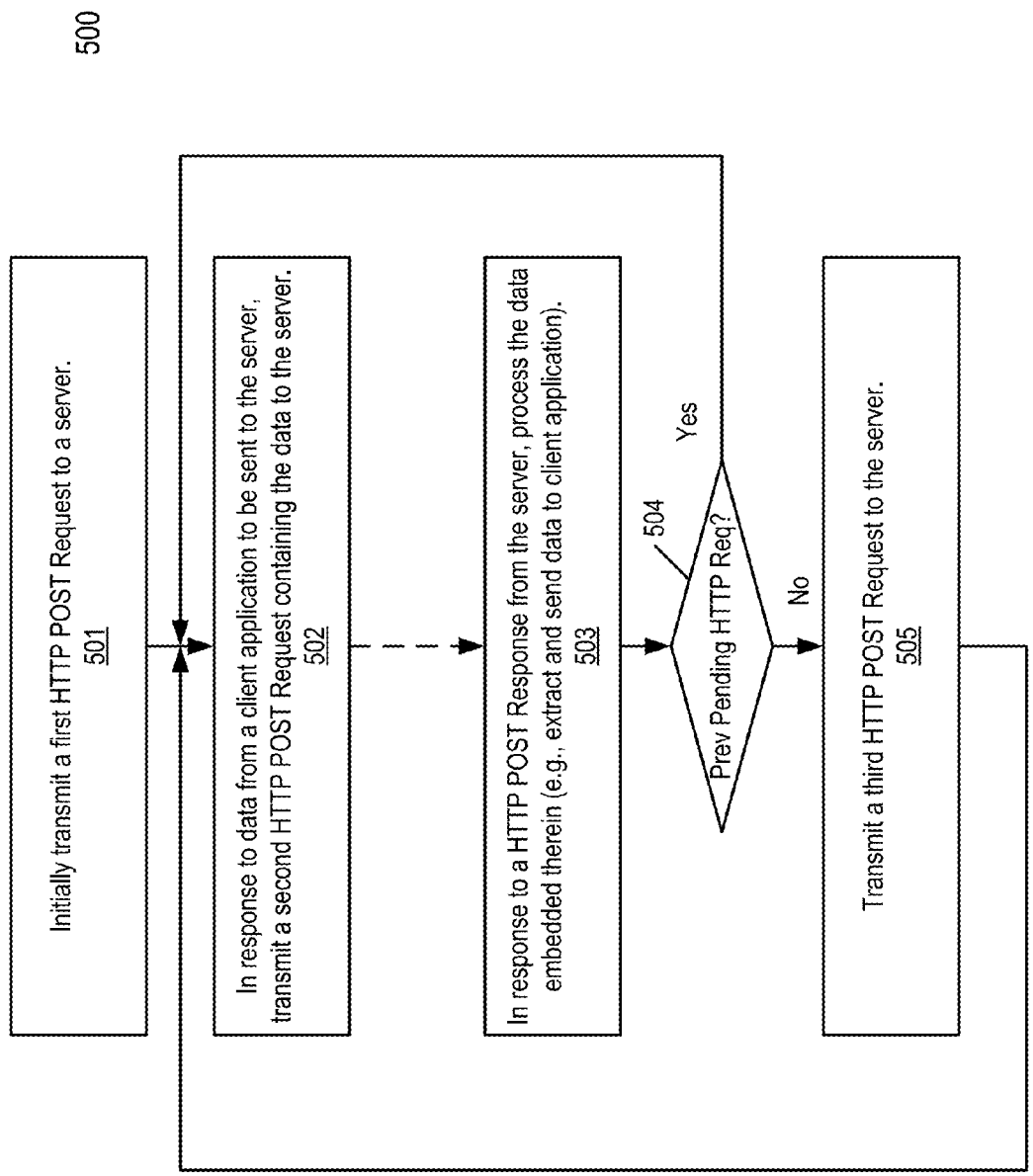
FIG. 5 is a flow diagram illustrating a method for processing management messages according to one embodiment of the invention.

FIG. 5 is a flow diagram illustrating a method for processing management messages according to one embodiment of the invention. Method 500 may be performed by a network access device of FIGS. 1-2. Referring to FIG. 5, at block 501, a network access device initially sends an HTTP request (e.g., POST request) to a management server. In one embodiment such a request may be sent only after the UDP/HTTP registration process described above has been successfully performed indicating that the server supports such a UDP/HTTP mechanism. The initial HTTP request may be an empty HTTP request for the purpose of keeping a persistent HTTP connection open to allow the server to initiate sending data to the network access device. At block 502, in response to data received from a client of the network access device, the network access device transmits a second HTTP request having the data embedded therein to the management server. Subsequently in response to a HTTP response received from the management server, at block 503, network access device processes the data as usual (e.g., standard UDP process), for example, including the extracting the UDP payload from the HTTP response, obtaining a network management message from the UDP payload, and transmitting the management message to the client. In addition, at block 504, it is determined whether there is a pending HTTP request that has not received a response from the management server. If there is no outstanding HTTP request, at block 505, the network access device sends a third HTTP request to the management server to keep the HTTP connection alive. The above operations may be iteratively performed by a process.

Figure 6:
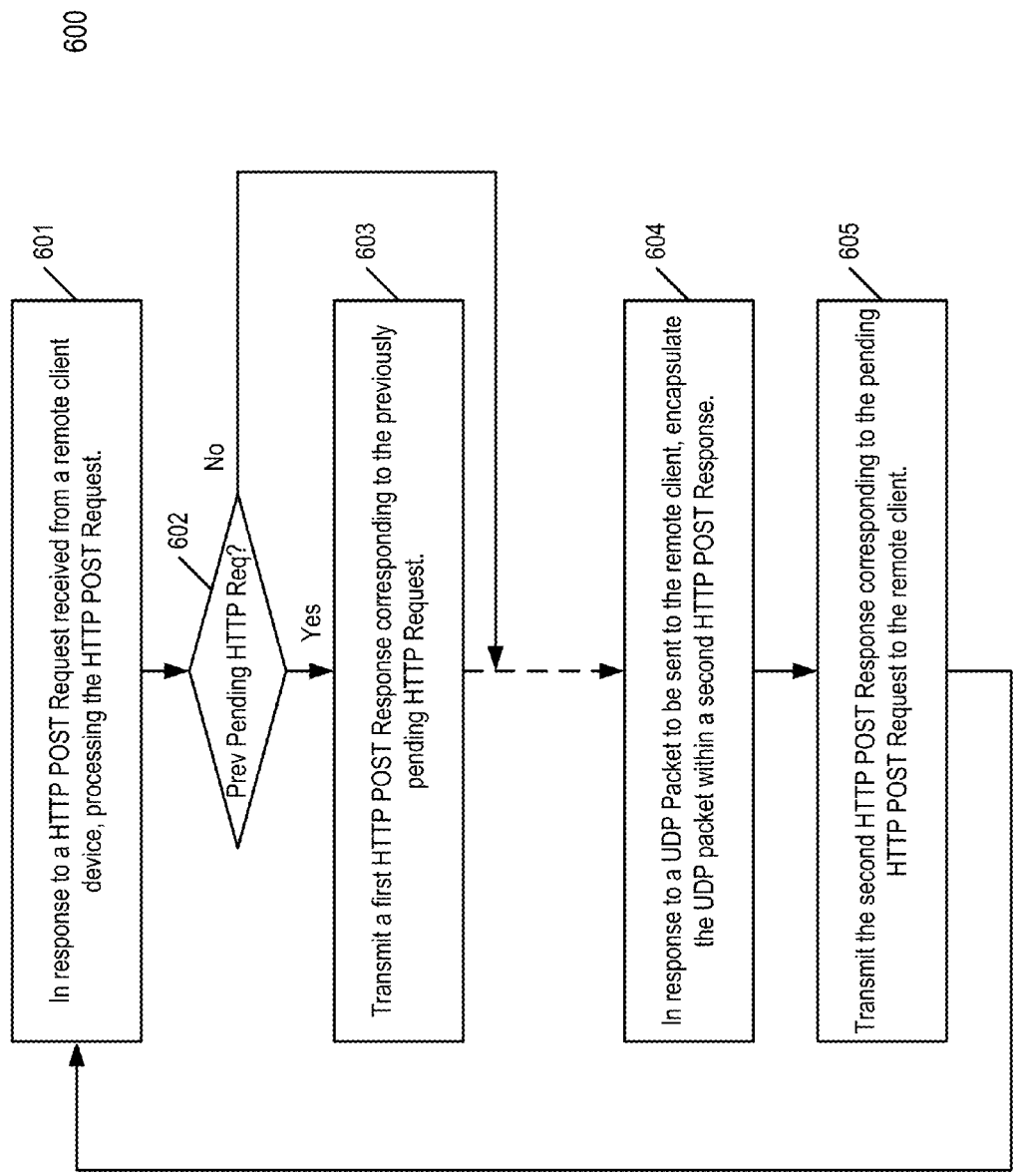
FIG. 6 is a flow diagram illustrating a method for processing management messages according to another embodiment of the invention.

FIG. 6 is a flow diagram illustrating a method for processing management messages according to another embodiment of the invention. Method 600 may be performed by a management server of FIGS. 1-2. Referring to FIG. 6, at block 601, in response to an HTTP request (e.g., POST request) from a remote client device (e.g., network access device), the HTTP request is processed at the server according to the standard HTTP protocol. At block 602, it is determined whether there is an HTTP request currently pending. If so, a response corresponding to the outstanding HTTP request is returned to the remote device, while withholding the newly received HTTP request. Subsequently in response to a UDP packet to be sent to the remote client, at block 604, processing logic encapsulates the UDP packet within an HTTP response to an outstanding HTTP request. At block 605, the HTTP response having the UDP packet encapsulated therein is transmitted to the remote device. The above operations may be iteratively performed by a process.

Figure 7A:
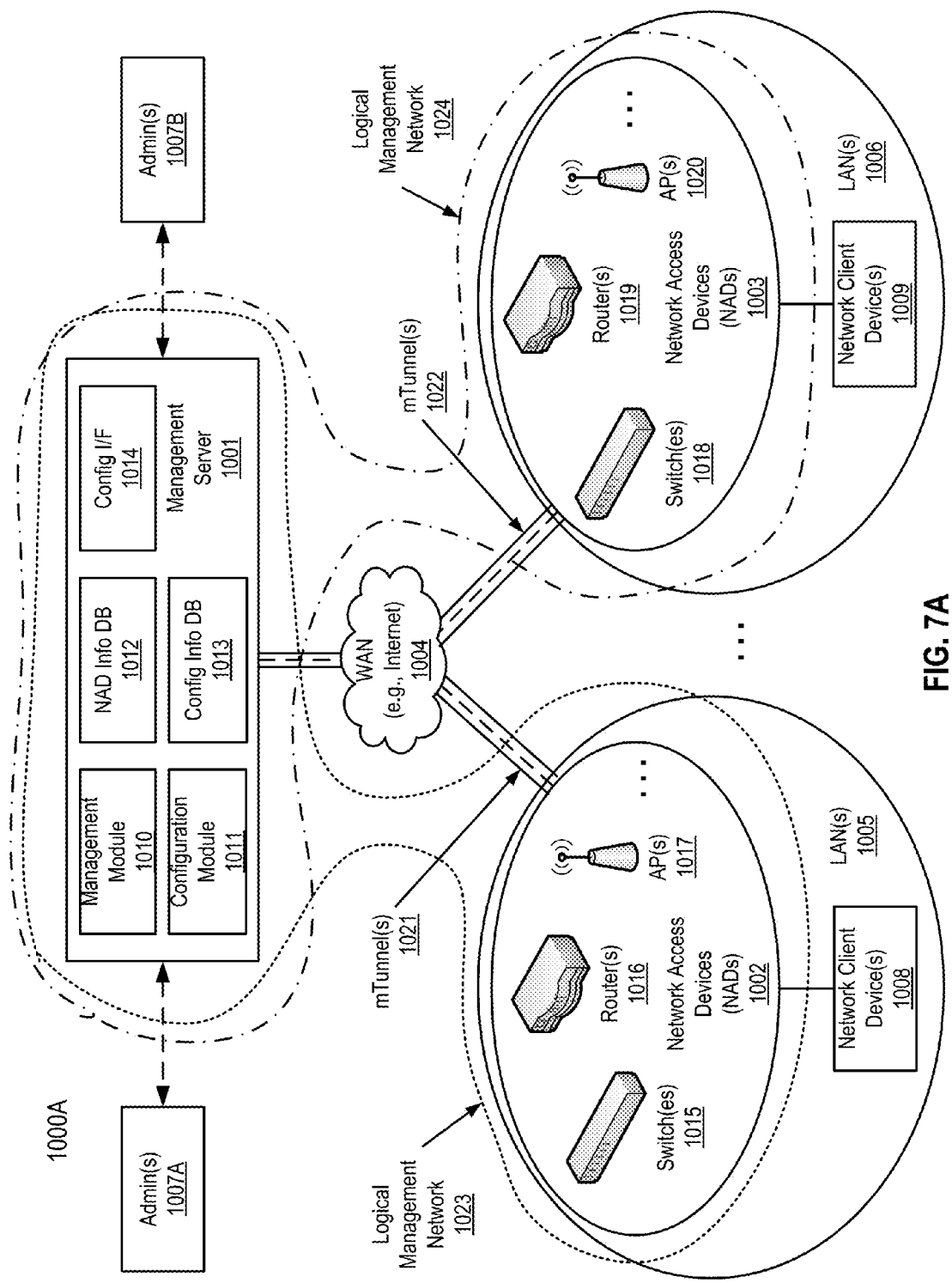
FIGS. 7A and 7B are block diagrams illustrating a cloud managed network configuration according to some embodiments of the invention.

FIG. 7A is a block diagram illustrating a cloud managed network system according to one embodiment of the invention. System 1000A may be implemented as part of any of the network systems described above. For example, management server 1001 may represent management server 101 and network access devices 1002-1003 may present any of network access devices 102-103 of FIG. 1. Referring to FIG. 7A, system 1000A includes, but is not limited to, various network access devices (NADs) 1002-1003 managed by a management server 1001 over WAN 1004. Management server 1001 may be a Web or cloud server, or a cluster of servers, running on server hardware. Each of network access devices 1002-1003 may be associated with a LAN such as LANs 1005-1006. A LAN herein may also refer to a sub-network or network segment (e.g., subnet or a virtual LAN (VLAN)) of a larger LAN (e.g., Intranet). Network 1004 may be the Internet. Any of network access devices 1002-1003 may operate as a gateway device (e.g., routers 1016 and 1019), an access point (AP) (e.g., APs 1017 and 1020), a network switch (e.g., switches 1015 and 1018), or a combination thereof to LANs 105-106, wired or wireless, where various network client devices (NCDs) 1008-1009 can be communicatively coupled to LANs 105-106.

According to one embodiment, a network access device may represent a gateway device interfacing a LAN to WAN 1004 and performs network address translation (NAT) for its clients, which may be client devices 1008-1009 or other network access devices. A network access device may be configured behind another network access device. For example, an uplink of an access point may be coupled to a downlink of a gateway device. Alternatively, an uplink of a network switch may be coupled to a downlink of a gateway device or an access point, etc. A network access device may be an integrated device integrating two or more of these functionalities (e.g., router/gateway, access point, and/or network switch), wired and/or wireless.

Referring back to FIG. 1, in one embodiment, management server 1001 works for both single and multi-tenant installations, meaning that multiple organizations with different network administrators may have network access devices managed by the same management server, and network configuration or management can be performed using the same management server, but that are firewalled off from each other and do not have access to each other's network configurations. In this example, network access devices 1002 and network access devices 1003 may be associated with or owned by the different organizations and administrated by different network administrators 1007A and 1007B associated with the organizations. Some of network access devices 1002 may communicate with each other to form a local mesh network, while some of network access devices 1003 may communicate with each other to form another local mesh network.

According to one embodiment, management server 1001 includes a management module 1010 and a configuration module 1011 to manage and to configure network access devices 1002-1003 and to generate management server configuration information for each of network access devices 1002-1003, which may be stored in configuration information database 1013. In one embodiment, management server 1001 provides a user interface 1014 such as a Web interface to allow a network administrator such as administrators 1007A and 1007B to create and log into an account associated with an organization to which the network access devices 1002 or network access devices 1003 belong.

The management server 1001 further includes a NAD information database 1012, including information regarding the network access devices 1002-1003. In one embodiment, the NAD information database 1012 includes a serial number and a mechanism to authenticate the network access device's identity (e.g., the public key of a private public key pair, the private key of which was embedded or stored in the network access device during the manufacturing). NAD information database 1012 may be populated different ways in different embodiments (e.g., populated by the seller of the network access devices, populated by the network administrator). In embodiments in which this information is populated by the seller, different ones of these embodiments may associate the information regarding network access devices 1002-1003 in the router information database with the user account in different ways (example, network administrators 1007A and 1007B may provide an order number (or invoice number) associated with a purchase of network access devices 1002 or 1003).

According to one embodiment, when a network access device is powered up and attempts entering network 1004, the network access device attempts to contact management server 1001. In one embodiment, certain device information such as an IP address or domain name service (DNS) name of management server 1001 is stored in the network access device when it is manufactured. In one embodiment, when the network access device is powered up, the network access device performs any self configuration processes including obtaining an IP address for itself from a dynamic host configuration protocol (DHCP) facility (which address may be a public IP address, or may be a private IP address if there is a device performing NAT between the router and the WAN (that is to say, the network access device is behind a device performing NAT)). The network access device then accesses management server 1001 based on the server's IP address and authenticates itself (e.g., signing a message (e.g., including the serial number of the network access device) using a private key associated (and/or stored) with the network access device, such that management server 1001 can authenticate the network access device using the associated public key (stored in NAD information database 1012) maintained by management server 1001).

In one embodiment, each of network access devices 102-103 creates one or more secure communication channels (e.g., a control tunnel) with server 1001 using the keys downloaded from management server 101 to exchange control traffic such as management messages or notification, operating statuses of the network access device, etc. Such a tunnel for network management purposes is referred to herein as an mTunnel. In this example, network access devices 1002 maintain at least one mTunnel 1021 with management server 1001 and network access devices 1003 maintain at least one mTunnel 1022 with management server 1001. In one embodiment, each of network access devices 1002 may maintain a persistent mTunnel with management server 1001. Alternatively, only the network access device operating as a gateway device maintains an mTunnel with management server 1001, while other network access devices behind the gateway device communicate with the gateway device to share the same mTunnel. Typically, a network access device operating as a gateway performs network address translation (NAT) for its clients, which may be a network client device or another network access device.

In one embodiment, once a network access device has been successfully authenticated by server 1001, the network access device downloads configuration information and stores it in a storage device within the network access device. This download may take place over a secure session layer (SSL)-encrypted session and/or the management server may encrypt the data using the public key corresponding to the private key. This secure channel may also be used to receive subsequent configuration updates from management server 1001. According to one embodiment, subsequently, when there is a change in the configuration, such as adding or removing a network access device, changing of subnet settings (for example, by an administrator such as administrators 1007A and 1007B via a Web interface of management server 1001), management server 1001 is to generate updated configuration information and communicate the updates to the network access devices via their corresponding mTunnels (such communication can be done with different mechanisms depending on the embodiment of type of information, including a push mechanism, a pull mechanism, etc.).

A variety of tunneling protocols can be utilized over an mTunnel between a network access device and management server 1001, such as, for example, Internet protocol (IP) over user datagram protocol (UDP) (IP/UDP) encapsulation. For example, a network management message may be carried as an IP packet and the IP packet may be encapsulated within a UDP packet exchanged between a network access device and management server 1001 over a respective mTunnel. In one embodiment, an IP packet having one or more network management messages embedded therein may be wrapped with a predetermined mTunnel header and is transmitted within a UDP packet between management server 1001 and a network access device, even if the network access device is behind a NAT device.

In some configurations, if a network access device is behind a firewall that does not allow any UDP packet going through, a UDP packet carrying a network management message may be encapsulated within a hypertext transport protocol (HTTP), referred to herein as UDP over HTTP (UDP/HTTP). Since most of the firewalls allow Internet traffic using HTTP protocol with a transport control protocol (TCP) port of 80, it is likely a UDP packet embedded within an HTTP packet having a destination TCP port of 80 can reach management server 1001. In such a configuration, when management server 1001 receives the HTTP packet, it may remove any HTTP header to reveal a UDP packet encapsulated therein. Thereafter, an IP packet encapsulated within the UDP packet may be extracted and the network management message within the IP packet can be obtained.

According to one embodiment, management server 1001 and network access devices associated with an organization such as network access devices 1002 may utilize a private or internal set of IP addresses to exchange network management messages via the respective mTunnel or mTunnels. That is, the private IP addresses used by management server 1001 and network access devices 1002 via the respective mTunnel or mTunnels may be in a separate IP address space (e.g., 6.x.x.x) that is different from an IP address space used between network access devices 1002 and their network client devices 1008 over LAN(s) 1005 (e.g., 10.x.x.x). That is, the private IP addresses described herein are only used between management server 1001 and network access devices 1002 to exchange network management messages over the respective mTunnel(s). In this example, management server 1001 and network access devices 1002 using private IP addresses to exchange network management messages over mTunnel(s) 1021 forms a logical network 1023 (e.g., a logical management network).

Similarly, management server 1001 and network access devices 1003 of another organization in this example may utilize a different set of private or internal IP addresses to exchange network management messages through the respective mTunnel or mTunnels, where the private IP addresses may be in a different IP address space than the one of IP addresses used between network access devices 1003 and their client devices 1009. Similarly, in this example, management server 1001 and network access devices 1003 using private IP addresses to exchange network management messages over mTunnel(s) 1022 forms a logical network 1024 (e.g., a logical management network). The private IP addresses (referred to herein as a first set of private IP addresses) used between management server 1001 and network access devices 1002 may be different than the private IP addresses (referred to herein as a second set of private IP addresses) between network access devices 1003 and management server 1001. The first and second sets of private IP addresses may be in different IP address spaces or in the same IP address space dependent upon the specific configuration.

According to one embodiment, when a network access device is powered up and initialized, the network access device performs certain self-configuration operations to determine whether the network access device should operate as a gateway or as an access point behind a gateway. In one embodiment, when a network access device boots up, it initializes its Ethernet interface and attempts to request an IP address (e.g., a publicly accessible IP address over the Internet, also referred to as an uplink IP address) by broadcasting its media access control (MAC) address within a dynamic host configuration protocol (DHCP) request via its Ethernet interface. If the Ethernet interface of this network access device is connected to the Internet, a DHCP server, which may be a separate server or part of management server 1001, will respond with a valid IP address assignment, and the network access device will operates as a gateway device. If there is no DHCP response received within a predetermined period of time, the network access device assumes that it is operating behind another gateway device that performs NAT, and the network access device then joins an existing network and operates as an access point.

According to one embodiment, when operating behind a gateway, each of the network access devices derives its own IP address and assigns IP addresses to its client devices using a predetermined method in a consistent manner. In one embodiment, a network access device performs a hash operation on at least a portion of its hardware identifier such as a MAC address to generate an IP address. In a particular embodiment, a network access device hashes its 6-byte MAC address using a predetermined hash function (e.g., CRC-32 hash function) to generate lower three bytes of its IP address. Note that each of the network access devices may generate two IP addresses for itself: 1) an IP address in a first IP address space (e.g., 6.x.x.x) solely for communicating network management messages with management server 1001 via an mTunnel; and 2) an IP address in a second IP address space (e.g., 10.x.x.x) for normal network traffic with its client devices.

Similarly, when a network client device, such as client devices 1008, requests an IP address, the associated network access device hashes a MAC address of the client device to derive an IP address for the client device. Since each of the network access devices performs the same hash operation using the same hash function on a MAC address of a client device, the client device can consistently obtain the same IP address from different network access devices. As result, the client device can roam across different network access devices without having to change its IP address or to perform any address resolution protocol (ARP) related operations.

Figure 7B:
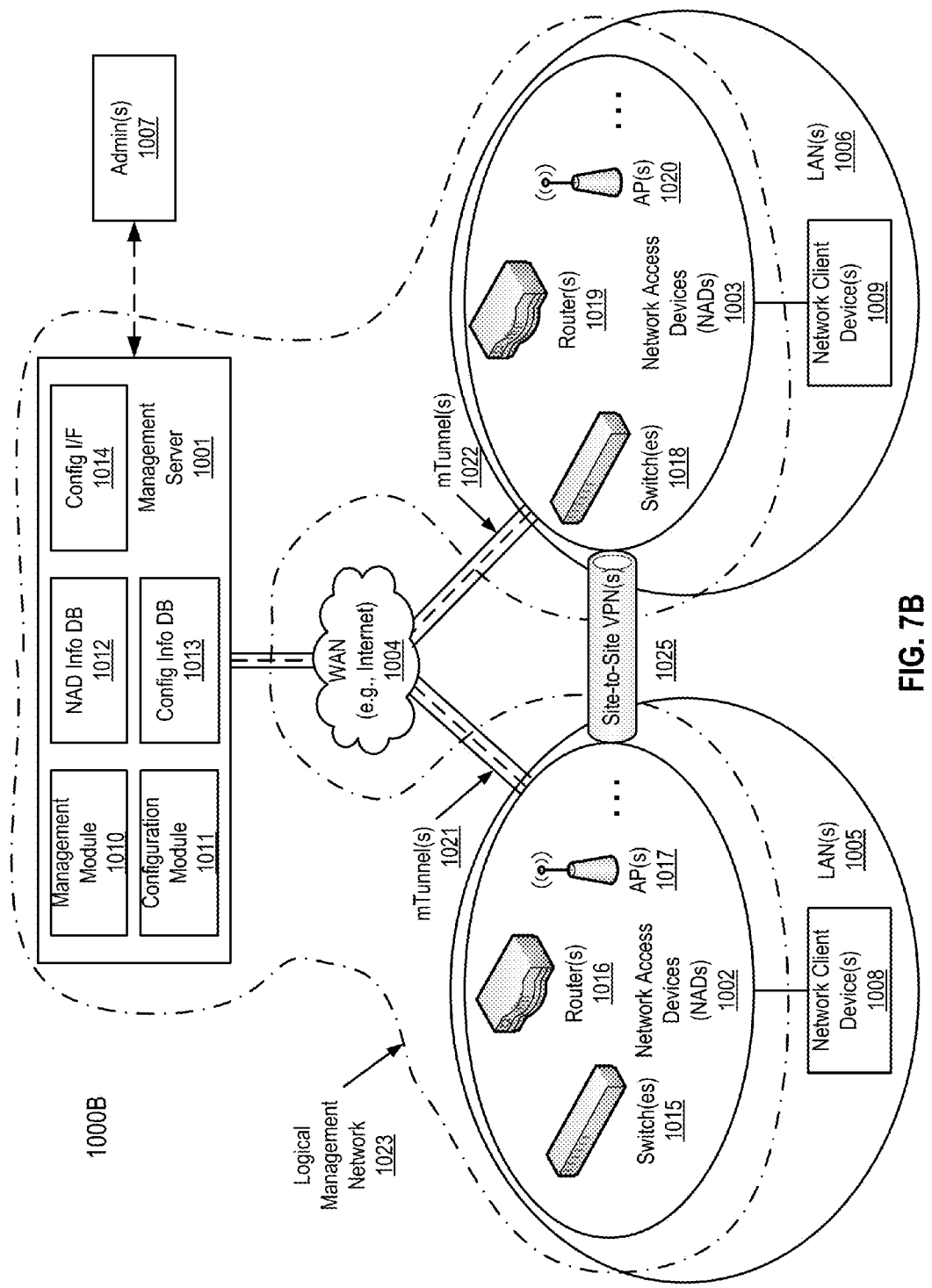

Referring back to FIG. 7A, as described above, network access devices 1002 and network access devices 1003 are associated with different organizations and managed by management servers 1001. In other configurations, network access devices 1002 and network access devices 1003 may be associated with the same organization as shown as system 1000B in FIG. 7B. Referring to FIG. 7B, in this configurations, network access devices 1002 and network access devices 1003 may be deployed and located at different sites or geographical locations of the organization. According to one embodiment, at least one virtual private network (VPN) tunnel 1025 is maintained between at least one of network access devices 1002 and at least one of network access devices 1003, also referred to as a site-to-site VPN. Some or all of the network access devices can be configured, via configuration interface 1014, to participate in the site-to-site VPN.

Figure 8:
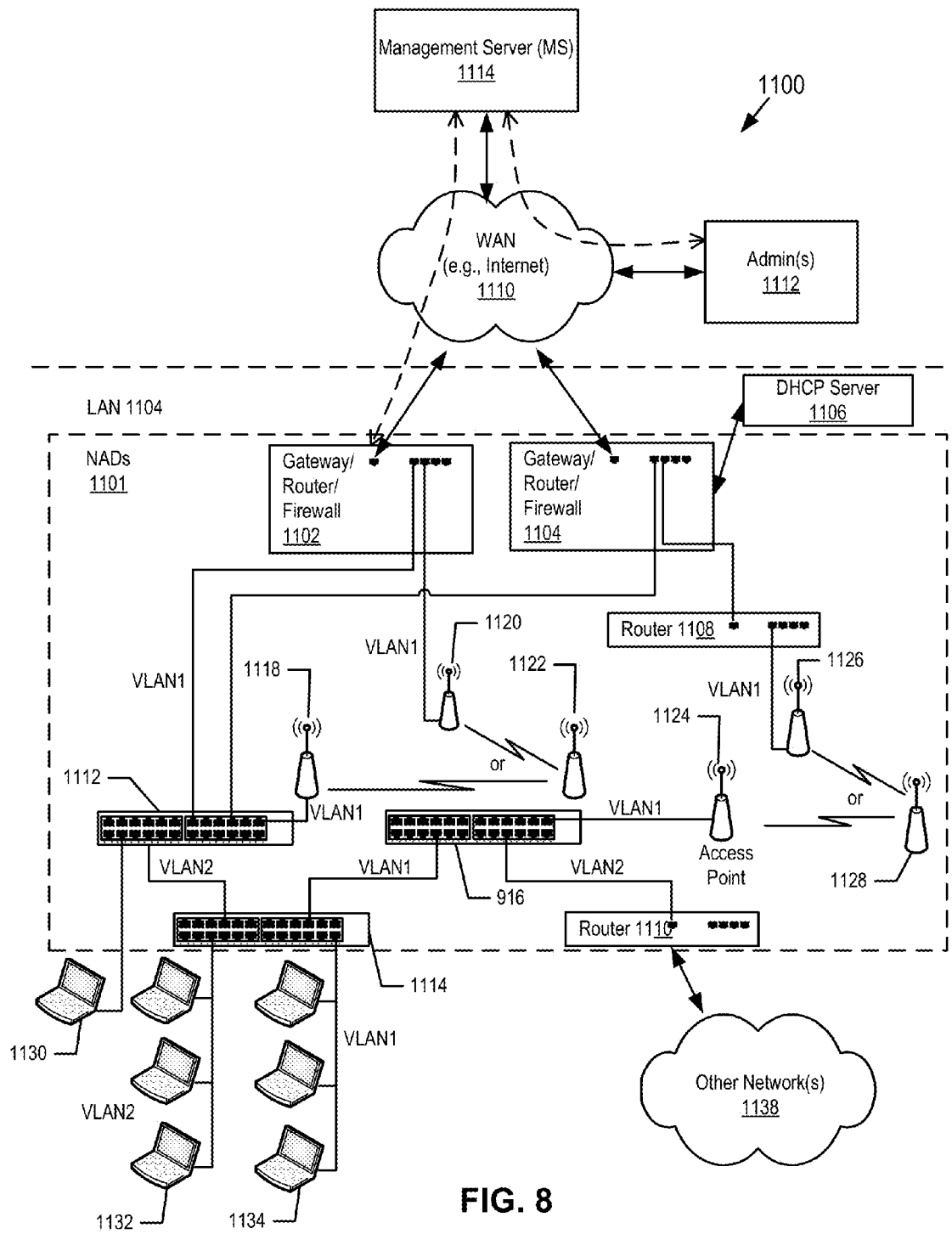
FIG. 8 is a block diagram illustrating a network configuration in accordance with another embodiment of the invention.

FIG. 8 is a block diagram illustrating a network configuration in accordance with an embodiment of the invention. Network configuration 1100 may be implemented as part of network configurations as shown in FIGS. 7A and 7B. The configuration of NADs 1101 represents one possible implementation of one of the LANs 1005 and 1006 of FIGS. 7A-7B, such as the one including an access network, where one or more of NADs 1101 are in accordance with embodiments of the present invention. That is, any of the routers (e.g., 1102, 1104, 1108 and 1110), network switches (e.g., 1112-1114), and wireless access points (e.g., 1118-1128) shown in FIG. 8 may be implemented by way of the previously described network access devices, including NADs 1002 and 1003 of FIGS. 7A-7B. FIG. 8 illustrates the complexity and variety of possible configurations that may need to be accounted for by a system administrator (e.g., admin 1112) when configuring a network access device within LAN 1104. For example, LAN 1104 includes multiple gateways to WAN 1110, multiple VLANs, and multiple possible paths to WAN 1110 by many of the NADs 1101. A change in one of the NADs 1101 may require complex configuration changes to one or more of the downstream NADs. To be sure, a configuration change or fault in wireless access point 1120 may result in required configuration changes to wireless access points 1122 and 1118, and network switches 1112 and 1114. Similarly, a configuration change or fault in router 1108 may result in required configuration changes to wireless access points 1126, 1128, and 1124, network switches 1116 and 1114, and router 1110. As is apparent, manual configuration of the network access devices in a network such as LAN 1104 can be complex and extremely error prone. Furthermore, changes to LAN 1104 resulting is a loss of network connectivity may be difficult to diagnose and troubleshoot. Accordingly, embodiments of the present disclose allow for an installer to install one or more of NADs 1101 by simply powering on the device and connecting a cable. Then, the NAD may automatically establish a connection to WAN 1110, such that Administrator 1112 may remotely configure NAD 1102 by way of management server 1114. Furthermore, NADs 1101 may be configured to periodically test their connection to WAN 1110 and if it is lost, to automatically establish a new connection to WAN 1110, so as to reduce down time of LAN 1104.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for exchanging network management messages between a network access device and a management server, the method comprising:
periodically sending a PING or HELLO message from the network access device to the management server;
determining whether a response to the PING or HELLO message is received from the management server within a predetermined period of time;
determining, at the network access device, whether the management server is reachable using a UDP protocol based at least upon the response to the PING or HELLO message;
receiving, at the network access device, a user datagram protocol (UDP) packet from a client to be transmitted to the management server over Internet, the UDP packet including a management message to be sent to the management server, wherein the network access device is one of a plurality of network access devices managed by the management server over the Internet, wherein each of the network access devices represents one of a router, an access point, and a switch, wherein each of the network access devices is associated with a local area network (LAN) and provides access to the LAN for its client devices;

transmitting the UDP packet to the management server using the UDP protocol over the Internet if it is determined that the management server is reachable using the UDP protocol;

if the management server is unreachable using the UDP protocol,
- extracting a UDP payload from the UDP packet,
- encapsulating the UDP payload within a hypertext transfer protocol (HTTP) POST request, the HTTP POST request including a predetermined universal resource locator (URL) associated with the management server, and
- transmitting the HTTP POST request having the UDP payload encapsulated therein to the management server using a HTTP protocol over the Internet.

2. The method of claim 1, further comprising: receiving a first HTTP POST response from the management server, the first HTTP POST response corresponding to a first HTTP POST request previously sent to the management server; determining whether there is another HTTP POST request currently pending that has not received a response from the management server; and transmitting a second HTTP POST request to the management server if there is no HTTP POST request currently pending.

3. The method of claim 2, further comprising: prior to transmitting the second HTTP POST request, delaying a predetermined period of time to determine whether there is data pending to be sent to the management server; and encapsulating the data as a UDP payload in the second HTTP POST request, if there is data pending to be sent to the management server.

4. The method of claim 3, further comprising transmitting the second HTTP POST request without a UDP payload if there is no data pending to be sent to the management server.

5. The method of claim 1, wherein determining whether the management server is reachable using a UDP protocol comprises:
- periodically transmitting a first UDP packet to the management server using the UDP protocol; and
- examining a response corresponding to the first UDP packet expected from the management server, wherein the management server is unreachable using the UDP protocol if the response is not received within a predetermined period of time.

6. The method of claim 5, further comprising storing UDP state information in a storage device of the network access device indicating whether the management server is reachable using the UDP protocol, wherein the UDP state information is utilized during a subsequent reboot of the network access device to determine the UDP protocol or the HTTP protocol should be used to reach the management server, without having to send an additional UDP packet to the management server to determine whether the management server is reachable using the UDP protocol.

7. The method of claim 1, further comprising initially transmitting a third HTTP POST request to the management server prior to sending the second HTTP POST request, wherein the second HTTP POST request is transmitted to the management server without waiting for an HTTP response from the management server in response to the third HTTP POST request.

8. A network access device, comprising:
a user datagram protocol (UDP) module to receive a UDP packet from a client to be transmitted to a management server over Internet, the UDP packet including a management message to be sent to the management server, wherein the network access device is one of a plurality of network access devices managed by the management server over the Internet, wherein each of the network access devices represents one of a router, an access point, and a switch, wherein each of the network access devices is associated with a local area network (LAN) and provides access to the LAN for its client devices;

a UDP monitoring module coupled to the UDP module to:
- periodically send a PING or HELLO message to the management server,
- determine whether a response to the PING or HELLO message is received from the management server within a predetermined period of time, and
- determine whether the management server is reachable using a UDP protocol based at least upon the response to the PING or HELLO message, wherein the UDP module is configured to transmit the UDP packet to the management server using the UDP protocol over the Internet if it is determined that the management server is reachable using the UDP protocol; and a UDP-hypertext transfer protocol (HTTP) module (UDP/HTTP) coupled to the UDP monitoring module and the UDP module, if the management server is unreachable using the UDP protocol, configured to
- extract a UDP payload from the UDP packet,
- encapsulate the UDP payload within a HTTP POST request, the HTTP POST request including a predetermined universal resource locator (URL) associated with the management server, and
- transmit the HTTP POST request having the UDP payload encapsulated therein to the management server using a HTTP protocol over the Internet.

9. The network access device of claim 8, wherein the UDP module is to receive a first HTTP POST response from the management server, the first HTTP POST response corresponding to a first HTTP POST request previously sent to the management server and to determine whether there is another HTTP POST request currently pending that has not received a response from the management server, and wherein the UDP/HTTP module is to transmit a second HTTP POST request to the management server if there is no HTTP POST request currently pending.

10. The network access device of claim 9, wherein the UDP/HTTP module is to, prior to transmitting the second HTTP POST request, delay a predetermined period of time to determine whether there is data pending to be sent to the management server and to encapsulate the data as a UDP payload in the second HTTP POST request, if there is data pending to be sent to the management server.

11. The network access device of claim 10, wherein the UDP module is to transmit the second HTTP POST request without a UDP payload if there is no data pending to be sent to the management server.

12. The network access device of claim 8, wherein in determining whether the management server is reachable using a UDP protocol, the UDP monitoring module is configured to:
- periodically transmit a first UDP packet to the management server using the UDP protocol, and
- examine a response corresponding to the first UDP packet expected from the management server, wherein the management server is unreachable using the UDP protocol if the response is not received within a predetermined period of time.

13. The network access device of claim 12, wherein the UDP monitoring module is to store UDP state information in a storage device of the network access device indicating whether the management server is reachable using the UDP protocol, wherein the UDP state information is utilized during a subsequent reboot of the network access device to determine the UDP protocol or the HTTP protocol should be used to reach the management server, without having to send an additional UDP packet to the management server to determine whether the management server is reachable using the UDP protocol.

14. The network access device of claim 8, wherein the UDP/HTTP module is to initially transmit a third HTTP POST request to the management server prior to sending the second HTTP POST request, wherein the second HTTP POST request is transmitted to the management server without waiting for an HTTP response from the management server in response to the third HTTP POST request.

15. A computer-implemented method for exchanging network management messages between a network access device and a management server, the method comprising:
receiving, at a management server, a PING or HELLO message from the network access device that periodically sends the PING or HELLO message to the management server, the network access device being one of a plurality of network access devices managed by the management server over the Internet, and wherein each of the network access devices represents one of a router, an access point, and a switch, wherein each of the network access devices is associated with a local area network (LAN) and provides access to the LAN for its client devices;
sending, from the management server to the network access device, a response based upon the PING or HELLO message;
receiving, at the management server, a second hypertext transfer protocol (HTTP) POST request from a network access device over the Internet;
extracting a user datagram protocol (UDP) payload from the second HTTP POST request, the UDP payload containing at least one network management message the network access device intends to send to the management server;
forwarding the UDP payload to a UDP processing module running within the management server for UDP processing;
determining whether a first HTTP POST request is still pending at the management server, wherein the first HTTP POST request was received from the network access device prior to the second HTTP POST request;
returning to the network access device over the Internet a HTTP POST response corresponding to the first HTTP POST request if the first HTTP POST request is still pending; and
retaining within the management server the second HTTP POST request as a pending HTTP POST request without responding if there is no previously received HTTP POST request pending.

16. The method of claim 15, further comprising:
prior to returning the HTTP POST response, delaying a predetermined period of time to determine whether there is data pending to be sent to the network access device; and
encapsulating the data as a UDP payload in the HTTP POST response, if there is data pending to be sent to the network access device.

17. The method of claim 15, further comprising:
maintaining a UDP to HTTP (UDP/HTTP) mapping table within the management server, the UDP/HTTP mapping table having one or more entries, each entry mapping one of the network access devices with a HTTP connection currently open for that network access device;
in response to a first UDP packet received from processing software running within the management server to be sent to a first network access device, performing a lookup operation in the UDP/HTTP mapping table to determine whether there is a pending HTTP POST request associated with the first network access device;
encapsulating at least a payload of the first UDP packet within a first HTTP POST response corresponding to the pending HTTP POST request associated with the first network access device, if it is determined there is a pending HTTP POST request;
transmitting the first HTTP POST response having at least the payload of the first UDP packet encapsulated therein to the first network access device; and
buffering the first UDP packet within the management server if there is no pending HTTP POST request for the first network access device.

18. The method of claim 17, wherein each of the entries of the UDP/HTTP mapping table maps a UDP socket identifier associated with a respective network access device to a HTTP POST request currently pending for the respective network access device, wherein a particular network access device having a pending HTTP POST request is identified if a UDP packet to be sent to that particular network access device includes information matching a UDP socket identifier in one of the entries in the UDP/HTTP mapping table.

19. A data processing system operating a management server, comprising:
a user datagram protocol (UDP)-hypertext transfer protocol (HTTP) module (UDP/HTTP) configured to:
receive a PING or HELLO message from a network access device that periodically sends the PING or HELLO message to the management server;
send, to the network access device, a response based upon the PING or HELLO message; and
receive a second HTTP POST request from the network access device over Internet, the network access device being one of a plurality of network access devices managed by the management server over the Internet, and wherein each of the network access devices represents one of a router, an access point, and a switch, wherein each of the network access devices is associated with a local area network (LAN) and provides access to the LAN for its client devices, wherein the UDP/HTTP module is to extract a user datagram protocol (UDP) payload from the second HTTP POST request, the UDP payload containing at least one network management message the network access device intends to send to the management server, wherein the UDP/HTTP module is configured to determine whether a first HTTP POST request is still pending, wherein the first HTTP POST request was received from the network access device prior to the second HTTP POST request, to return to the network access device over the Internet a HTTP POST response corresponding to the first HTTP POST request if the first HTTP POST request is still pending, and to retain within the management server the second HTTP POST request as a pending HTTP POST request without responding if there is no previously received HTTP POST request pending; and a UDP processing module coupled to the UDP/HTTP module to receive from the UDP/HTTP module and to process the UDP payload.

20. The system of claim 19, wherein the UDP/HTTP module is further configured to:

prior to returning the HTTP POST response, delay a predetermined period of time to determine whether there is data pending to be sent to the network access device, and encapsulate the data as a UDP payload in the HTTP POST response, if there is data pending to be sent to the network access device.

21. The system of claim 19, wherein the UDP/HTTP module is further configured to:

maintain a UDP to HTTP (UDP/HTTP) mapping table within the management server, the UDP/HTTP mapping table having one or more entries, each entry mapping one of the network access devices with a HTTP connection currently open for that network access device, in response to a first UDP packet received from processing software running within the management server to be sent to a first network access device, perform a lookup operation in the UDP/HTTP mapping table to determine whether there is a pending HTTP POST request associated with the first network access device, encapsulate at least a payload of the first UDP packet within a first HTTP POST response corresponding to the pending HTTP POST request associated with the first network access device, if it is determined there is a pending HTTP POST request, transmit the first HTTP POST response having at least the payload of the first UDP packet encapsulated therein to the first network access device, and buffer the first UDP packet within management server if there is no pending HTTP POST request for the first network access device.

22. The system of claim 21, wherein each of the entries of the UDP/HTTP mapping table maps a UDP socket identifier associated with a respective network access device to a HTTP POST request currently pending for the respective network access device, wherein a particular network access device having a pending HTTP POST request is identified if a UDP packet to be sent to that particular network access device includes information matching a UDP socket identifier in one of the entries in the UDP/HTTP mapping table.

* * * * *